(12) United States Patent
Choi et al.

(10) Patent No.: US 7,450,973 B2
(45) Date of Patent: Nov. 11, 2008

(54) APPARATUS AND METHOD FOR CONTROLLING BATTERY POWER IN A DIGITAL MULTIMEDIA BROADCASTING TERMINAL

(75) Inventors: Sang-Il Choi, Suwon-si (KR); In-Ki Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 11/284,222

(22) Filed: Nov. 21, 2005

(65) Prior Publication Data

US 2006/0111156 A1 May 25, 2006

(30) Foreign Application Priority Data

Nov. 19, 2004 (KR) .............. 10-2004-0095104

(51) Int. Cl.
*H04Q 7/32* (2006.01)
(52) U.S. Cl. ............... 455/572; 455/574; 455/550.1; 455/414.1; 455/343.1; 455/343.2; 370/311; 370/313; 370/310; 340/7.32; 340/7.33; 340/7.37

(58) Field of Classification Search ............. 455/572, 455/574, 550.1, 466, 414.1, 414.2, 414.3, 455/422.1, 403, 552.1, 553.1, 343.1, 343.2, 455/343.3, 343.5, 500, 517; 370/311, 313, 370/310; 340/7.32, 7.33, 7.37
See application file for complete search history.

(56) References Cited

U.S. PATENT DOCUMENTS

| 5,845,142 | A | 12/1998 | Hayasaka |
| 5,910,944 | A * | 6/1999 | Callicotte et al. ........... 370/311 |
| 7,305,259 | B1 * | 12/2007 | Malone et al. ............ 455/574 |

FOREIGN PATENT DOCUMENTS

| JP | 01-191913 | 8/1989 |
| JP | 05-268275 | 10/1993 |
| KR | 1020040080711 | 9/2004 |
| KR | 10-2004-85738 | 10/2004 |

* cited by examiner

*Primary Examiner*—Keith T Ferguson
(74) *Attorney, Agent, or Firm*—The Farrell Law Firm, PC

(57) ABSTRACT

An apparatus controls battery power in a mobile terminal supporting digital multimedia broadcasting (DMB) service. In the apparatus, first and second radio frequency (RF) signal processors respectively process DMB signals and call signals received through associated antennas. A DMB modem demodulates DMB signals output from the first RF signal processor. A voltage detector detects a voltage of the mobile terminal and disables the DMB modem if the detected voltage is less than or equal to a threshold.

10 Claims, 5 Drawing Sheets

APPARATUS AND METHOD FOR CONTROLLING BATTERY POWER IN A DIGITAL MULTIMEDIA BROADCASTING TERMINAL

PRIORITY

This application claims priority under 35 U.S.C. § 119 to an application entitled "Apparatus and Method for Controlling Battery Power in a Digital Multimedia Broadcasting Terminal" filed in the Korean Intellectual Property Office on Nov. 19, 2004 and assigned Serial No. 2004-95104, the contents of which are incorporated herein by reference.

BACKGROUND OF THE INVENTION

1. Field of the Invention

The present invention relates generally to a Digital Multimedia Broadcasting (DMB) terminal, and in particular, to an apparatus and method for controlling battery power in a DMB terminal.

2. Description of the Related Art

DMB service is a next-generation digital broadcasting service with which users can enjoy high-quality multi-channel multimedia broadcasting. Such DMB service is generally applied to portable terminals or vehicle-mounted terminals (VMTs). In addition, DMB service is classified into satellite DMB service and terrestrial DMB service according to its signal transmission method. Satellite DMB service refers to broadcasting service that transmits broadcasting contents via a satellite to enable users to view multi-channel multimedia broadcasting including various information such as video, audio and data, even while on the move.

A-multi-chip terminal supporting DMB service, such as a DMB terminal or a Video-on-Demand (VoD) terminal, requires high power consumption in providing DMB service. Therefore, in some cases, the terminal may fail to secure even the minimum battery power required for call service.

SUMMARY OF THE INVENTION

It is, therefore, an object of the present invention to provide an apparatus and method for efficiently controlling battery power to secure the battery power required for call service in a DMB terminal.

It is another object of the present invention to provide an apparatus and method for processing signals in response to software commands from a power-off controller mounted in a DMB modem of a DMB terminal.

It is further another object of the present invention to provide an apparatus for stably controlling battery power by measuring a battery power level for a predetermined time in a DMB terminal.

It is yet another object of the present invention to provide an apparatus and method for previously storing parameters for DMB service in case of power-off in a DMB terminal.

According to one aspect of the present invention, there is provided an apparatus for controlling battery power in a mobile terminal supporting DMB service. The apparatus comprises first and second radio frequency (RF) signal processors for respectively processing DMB signals and call signals received through associated antennas, a DMB modem for demodulating DMB signals output from the first RF signal processor, and a voltage detector for detecting a voltage of the mobile terminal and disabling the DMB modem if the detected voltage is less than or equal to a threshold.

According to another aspect of the present invention, there is provided a method for controlling battery power in a terminal including a DMB modem for receiving DMB signals and a voltage detector connected to the DMB modem. In the method, the voltage detector detects a voltage of the terminal and determines if the detected voltage is less than or equal to a threshold. The voltage detector disables the DMB modem if the detected voltage is less than or equal to the threshold.

According to a further aspect of the present invention, there is provided an apparatus for controlling battery power in a mobile terminal supporting DMB service. The apparatus comprises first and second RF signal processors for respectively processing DMB signals and call signals received through associated antennas, a DMB modem for demodulating DMB signals output from the first RF signal processor and responding to a power-off command received externally, and a controller for processing the call signals output from the second RF signal processor, and providing the power-off command to the DMB modem if battery power is less than or equal to a threshold.

Preferably, the DMB modem comprises a memory for interfacing with the power-off command provided from the controller; and a power-off controller for disabling the DMB modem in response to the power-off command.

Preferably, upon receiving the power-off command, the DMB modem determines whether a level of an initial average voltage for DMB service is less than or equal to a threshold. If the initial average voltage is less than or equal to the threshold, the DMB modem stores therein parameters used in an initial acquisition frequency table for DMB service and software for the DMB modem, and disables operation thereof.

Preferably, the controller periodically checks battery power, measures an average voltage for a predetermined time and generates the power-off command if the average voltage is less than or equal to a predetermined threshold.

According to yet another aspect of the present invention, there is provided a method for controlling battery power in a terminal including a DMB modem for demodulating DMB signals and a controller for processing call signals, in which the controller measures an average voltage for a predetermined time, and if the measured average voltage is less than or equal to a threshold, the controller generates a power-off command and provides the power-off command to the DMB modem. Upon receiving the power-off command, the DMB modem stores at least one parameter, and after storing the at least one parameter, disables operation thereof.

Preferably, the DMB modem further provides information indicating a successful power-off to the controller.

Preferably, the parameters comprise state parameters used in an initial acquisition frequency table for DMB service and software for the DMB modem.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention discloses a battery power control apparatus and method for performing emergency power-off to secure a predetermined minimum battery power for call service in a multi-chip terminal such as a DMB terminal or a VoD terminal.

In the following description, the present invention provides two different embodiments for generating an emergency power-off control signal: The first embodiment generates the emergency power-off control signal by hardware and the second embodiment generates the emergency power-off control signal by software.

Figure 1:
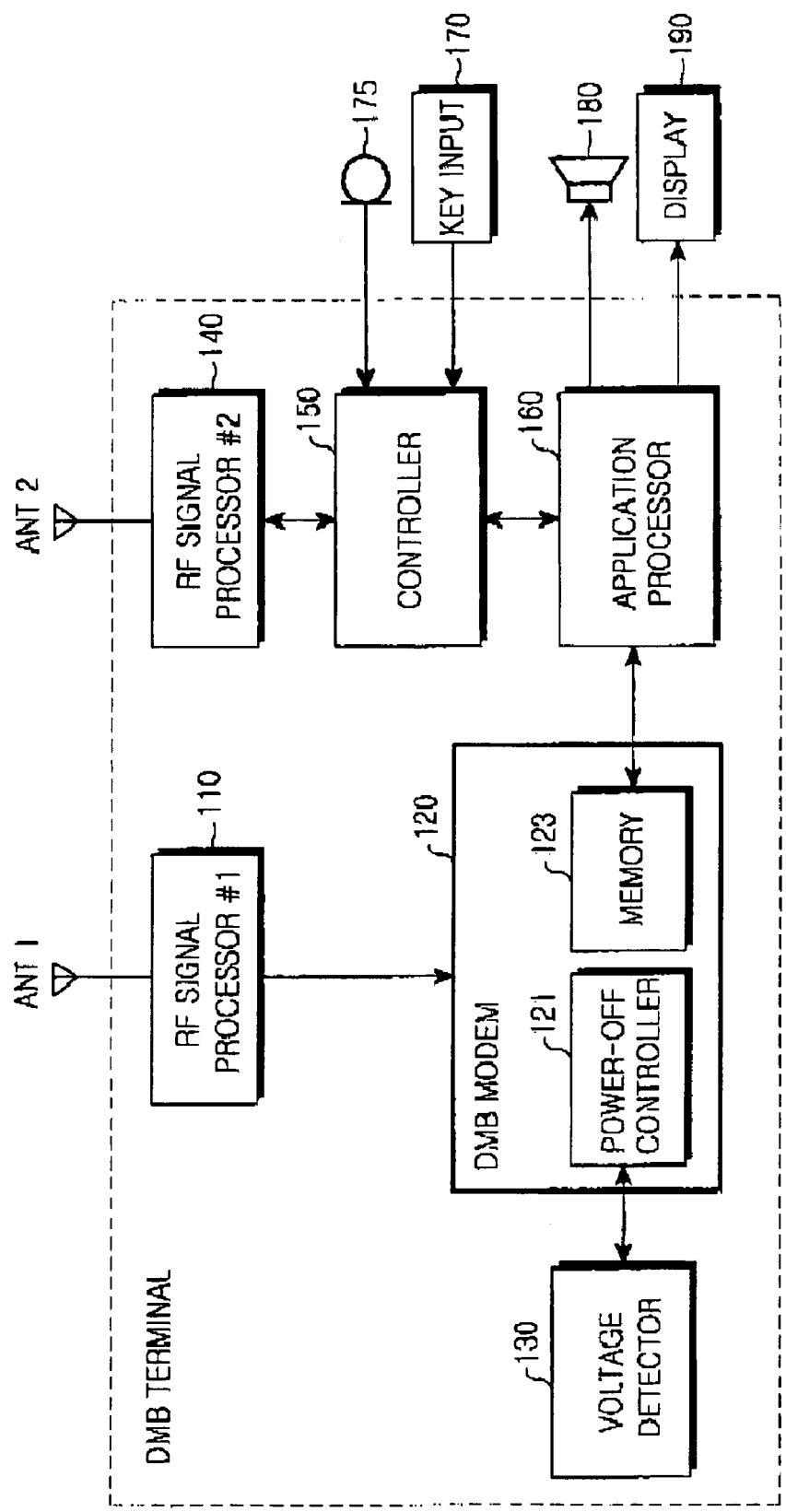
FIG. 1 is a block diagram illustrating an internal structure of a DMB terminal according to a first embodiment of the present invention.

FIG. 1 is a block diagram illustrating an internal structure of a DMB terminal according to a first embodiment of the present invention. In FIG. 1, a DMB terminal includes two antennas ANT1 and ANT2, for receiving DMB signals and transmitting/receiving call signals, respectively. First and second RF signal processors 110 and 140 down-convert RF signals received from their associated antennas ANT1 and ANT2 into intermediate frequency (IF) signals, convert the IF signals into digital signals and provide the digital signals to a DMB modem 120 and a controller 150, respectively.

The DMB modem 120 demodulates DMB signals output from the first RF signal processor 110. The DMB modem 120 includes therein a power-off controller 121 and a memory 123. The power-off controller 121, connected to a voltage detector 130, performs emergency power-off according to a signal output from the voltage detector 130. The voltage detector 130 provides a power-off signal to the power-off controller 121 upon detecting a voltage level less than or equal to a threshold Vth while monitoring a voltage level.

The controller 150 controls the overall operation of the DMB terminal and serves as a modem to demodulate digital signals output from the second RF signal processor 140. A key input unit 170 including a plurality of alphanumeric keys and function keys generates key signals corresponding to the keys selected by a user and provides the key signals to the controller 150. An application processor 160 processes multimedia data and outputs the processed multimedia data to a speaker 180 and/or display 190. The display 190 is implemented with a liquid crystal display (LCD) or light emitting diodes (LEDs), and displays visual data output from the application processor 160. The speaker 180 converts audio data output from the application processor 160 into audible sound.

For emergency power-off, the DMB terminal includes the voltage detector 130 shown in FIG. 1 to disable the DMB modem 120 when its battery power level approaches the minimum battery power level for call service, or is less than or equal to a threshold.

Figure 2:
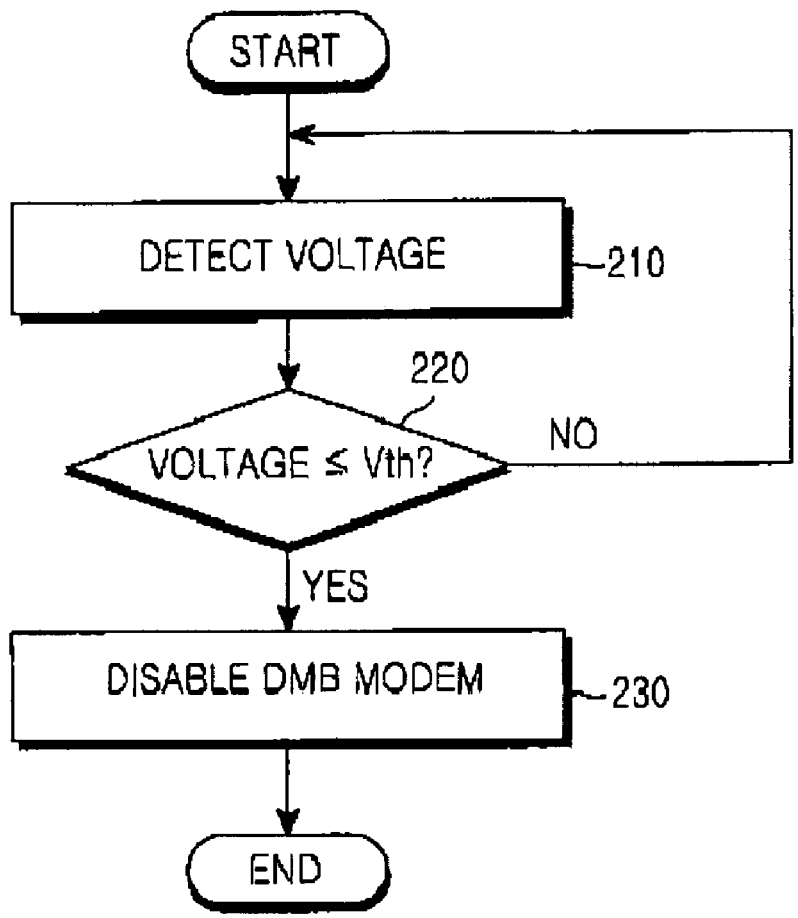
FIG. 2 is a flowchart illustrating a battery power control method in a DMB terminal according to the first embodiment of the present invention.

FIG. 2 is a flowchart illustrating an emergency power-off control method in a DMB terminal according to the first embodiment of the present invention. In FIG. 2, a voltage detector 130 detects a voltage level for a predetermined time and calculates an average voltage level in step 210 and determines in step 220 whether the average voltage level is less than or equal to a threshold. If it is determined in step 220 that the average power level is not less than or equal to the threshold, the voltage detector 130 returns to step 210 since the DMB terminal has enough battery power not only for DMB service but also for call service.

However, if it is determined in step 220 that the average power level is less than or equal to the threshold, the voltage detector 130 disables a DMB modem 120 to save battery power for call service in step 230.

Alternatively, the present invention proposes an apparatus and method for detecting an average power level by measuring battery power at stated periods, and disabling the DMB modem according to the detection result, thereby increasing software reliability and terminal stability.

Figure 3:
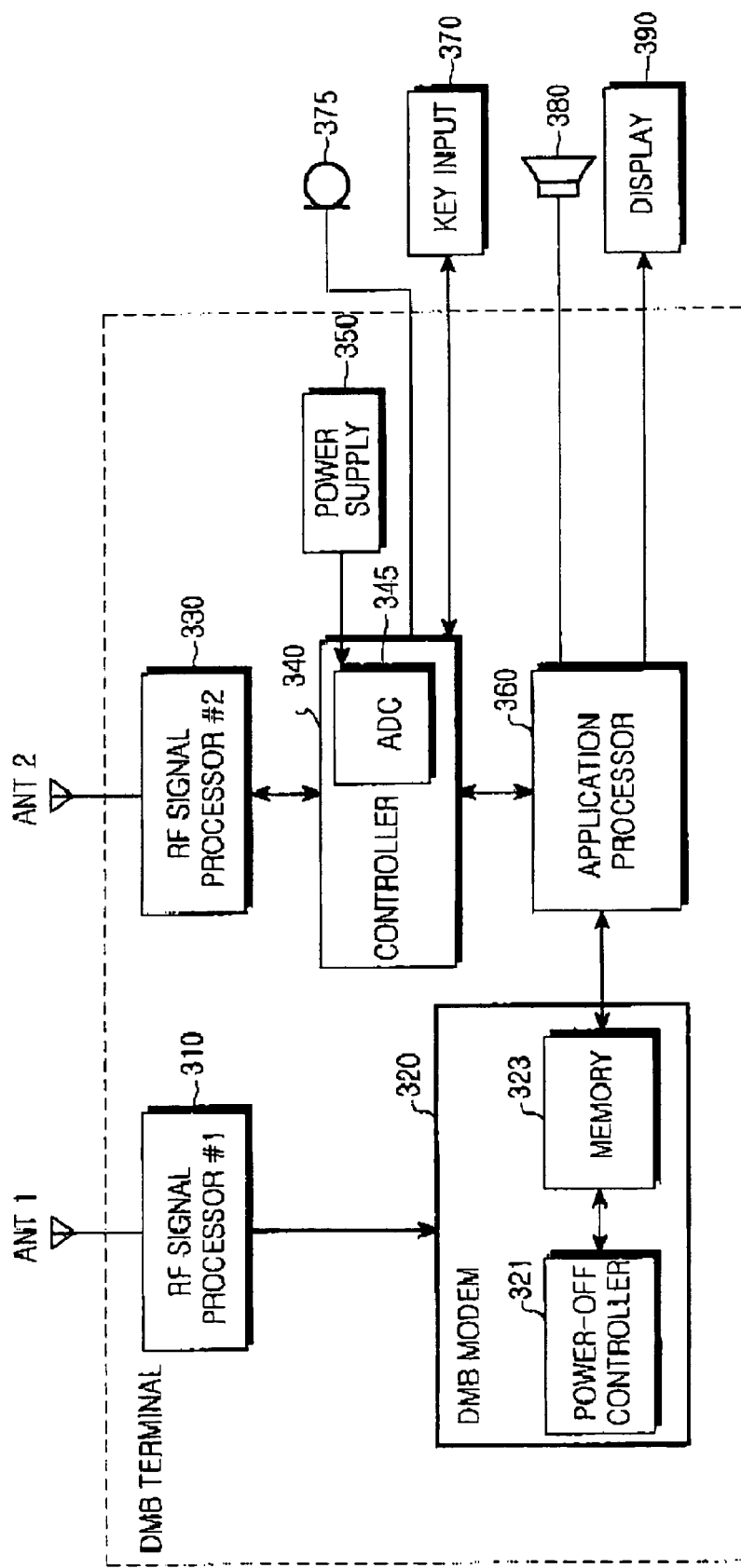
FIG. 3 is a diagram illustrating an internal structure of a DMB terminal according to a second embodiment of the present invention.

Next, with reference to FIG. 3, a description of an internal structure of a DMB terminal according to a second embodiment of the present invention will be provided.

Referring to FIG. 3, a DMB terminal includes two antennas ANT1 and ANT2, for receiving DMB signals and transmitting/receiving call signals, respectively. First and second RF signal processors 310 and 330 down-convert RF signals received from their associated antennas ANT1 and ANT2 into IF signals, convert the IF signals into digital signals, and provide the digital signals to a DMB modem 320 and a controller 340, respectively.

The DMB modem 320 demodulates DMB signals output from the first RF signal processor 310. The DMB modem 320 includes therein a power-off controller 321 and a memory 323. The power-off controller 321 software-enables/disables the DMB modem 320 in response to a power-off control command received externally through the memory 323.

The controller 340 controls the overall operation of the DMB terminal, serves as a modem to demodulate digital signals output from the second RF signal processor 330 and modulates call signals received through a microphone 375. The controller 340 serves as, for example, a Mobile Station Modem (MSM) for running various applications such as voice call service, short message service (SMS), multimedia service and Internet service. A key input unit 370 including a plurality of alphanumeric keys and function keys generates key signals corresponding to the keys selected by a user and provides the key signals to the controller 340. The microphone 375 converts an input voice signal into an electrical signal and provides the electrical signal to the controller 340.

An application processor 360 processes multimedia data and outputs the processed multimedia data to a speaker 380 and/or a display 390. The display 390 is implemented with LCD or LEDs and displays visual data output from the application processor 360. The speaker 380 converts audio data output from the application processor 360 into audible sound.

The controller 340 includes an analog-to-digital converter (ADC) 345 to periodically check a battery power level and calculate an average voltage measured for a predetermined time. If the average voltage is less than or equal to a threshold Vth, the controller 340 provides an emergency power-off command to the application processor 360 so that the application processor 360 disables the DMB modem 320.

Figure 4:
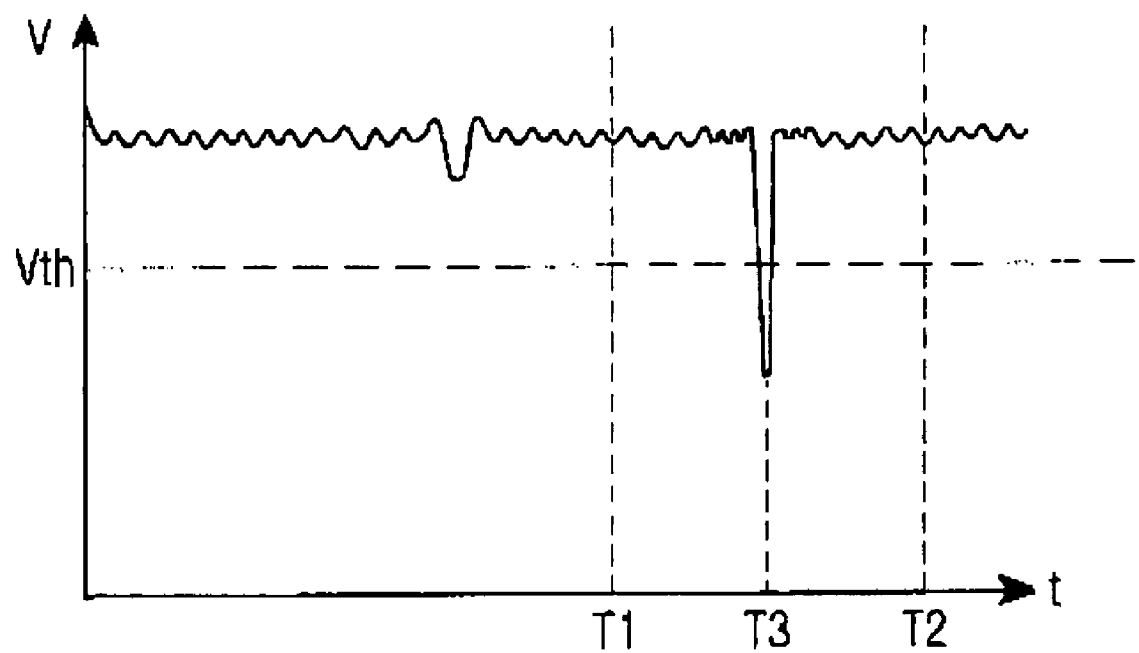
FIG. 4 is a graph illustrating a variation in voltage level with the passage of time.

The ADC 345 periodically monitors a power supply 350 and calculates an average voltage for a predetermined time, for example, from T1 to T2 in FIG. 4. If the calculated average voltage is less than or equal to a threshold Vth, the ADC 345 generates the emergency power-off command. In this manner, the DMB terminal can prevent the ADC 345 from erroneously generating the emergency power-off command upon detecting an instantaneous voltage drop at, for example, time T3, thereby ensuring its stable operation.

Figure 5:
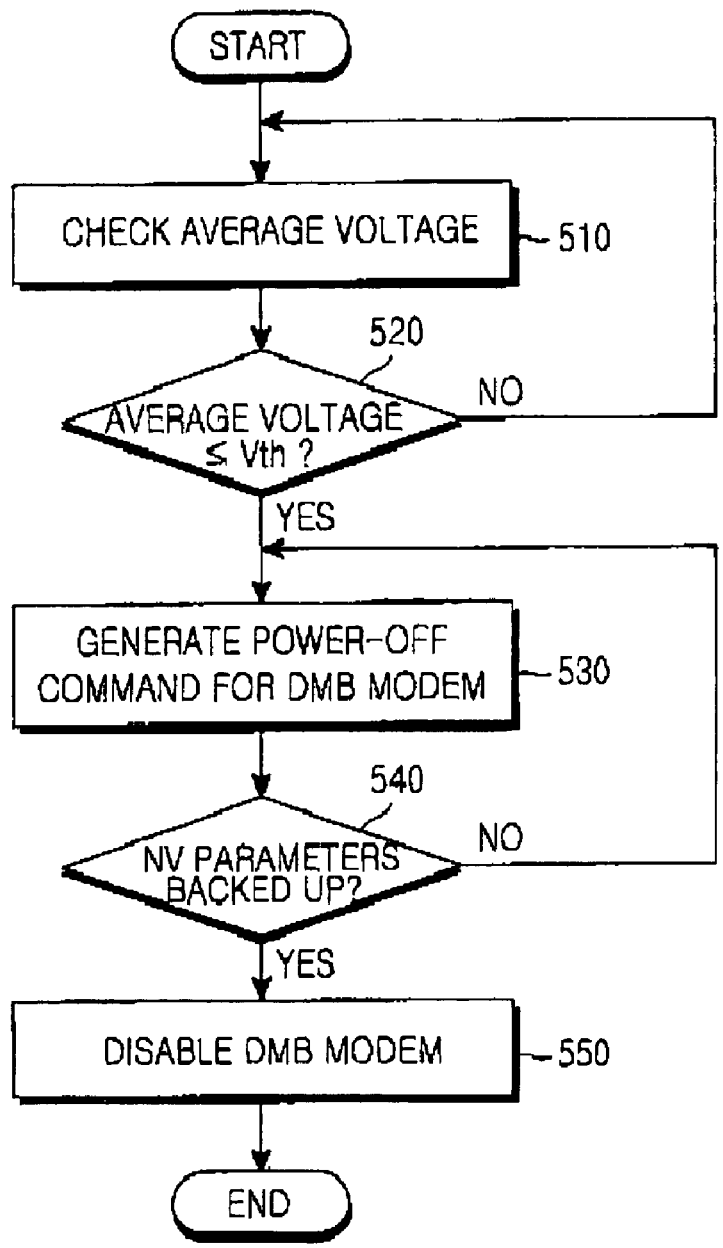
FIG. 5 is a flowchart illustrating a battery power control method in a DMB terminal according to the second embodiment of the present invention.

FIG. 5 is a flowchart illustrating a battery power control method in a DMB terminal according to the second embodiment of the present invention.

Referring to FIG. 5, in step 510, an ADC 345 in a controller 340 of the DMB terminal periodically checks a power supply 350 and calculates an average voltage for a predetermined time. Thereafter, the controller 340 determines in step 520 whether the calculated average voltage is less than or equal to a threshold Vth. If it is determined in step 520 that the calculated average voltage is not less than or equal to a threshold Vth, the controller 340 returns to step 510 as the power supply 350 has enough battery power for DMB service.

However, if it is determined in step 520 that the calculated average voltage is less than or equal to the threshold Vth, the controller 321 proceeds to step 530 where it generates a DMB modem disable command (or a power-off command) and provides the power-off command to a memory 323 (for example, a dual port random access memory (DPRAM)) that is interfaced therewith. Upon receiving the power-off command, the DMB modem 320 determines in step 540 whether nonvolatile (NV) parameters are stored in a NOR flash read-only memory (ROM) area thereof. The NV parameters are classified into an initial acquisition frequency table for DMB service and various state parameters used in software of the DMB modem 320. Herein, the NV parameters are stored to reduce the initial acquisition time required for receiving DMB service when the DMB modem 320 is later powered-on. For example, the initial acquisition frequency table includes mapping information between temperatures and frequencies. Therefore, when the DMB modem 320 is later powered-on and receives DMB service, the DMB modem 320 is not required to search for the frequency from the beginning, thereby reducing the initial acquisition time.

If it is determined in step 540 that the NV parameters are stored in the memory 323, a power-off controller 321 disables the DMB modem 320 in step 550 and provides information indicating the successful power-off to an application processor 360 that is interfaced with the memory 323.

As can be understood from the foregoing description, the novel DMB terminal disables the DMB modem upon detecting a low battery power level, thereby securing the minimum battery power necessary for call service. Alternatively, the controller performs power-off control on the DMB modem by software to enter the normal power-off mode, thereby preventing possible misuse and reducing initial acquisition time required for resuming receipt of DMB service at a later time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for controlling battery power in a mobile terminal supporting digital multimedia broadcasting (DMB) service, the apparatus comprising:
   first and second radio frequency (RF) signal processors for respectively processing DMB signals and call signals received through associated antennas;
   a DMB modem for demodulating DMB signals output from the first RF signal processor; and
   a voltage detector for detecting a voltage of the mobile terminal, and disabling the DMB modem if the detected voltage is less than or equal to a threshold.

2. A method for controlling battery power in a terminal including a digital multimedia broadcasting (DMB) modem for receiving DMB signals and a voltage detector connected to the DMB modem, the method comprising the steps of:
   detecting, by the voltage detector, a voltage of the terminal and determining if the detected voltage is less than or equal to a threshold; and
   disabling the DMB modem if the detected voltage is less than or equal to the threshold.

3. An apparatus for controlling battery power in a mobile terminal supporting digital multimedia broadcasting (DMB) service, the apparatus comprising:
   first and second radio frequency (RF) signal processors for respectively processing DMB signals and call signals received through associated antennas;
   a DMB modem for demodulating DMB signals output from the first RF signal processor and responding to a power-off command received externally; and
   a controller for processing call signals output from the second RF signal processor and providing the power-off command to the DMB modem if battery power is less than or equal to a threshold.

4. The apparatus of claim 3, wherein the controller periodically checks battery power, measures an average voltage for a predetermined time and generates the power-off command if the average voltage is less than or equal to a threshold.

5. The apparatus of claim 4, wherein the controller includes an analog-to-digital converter (ADC) for measuring the battery power.

6. The apparatus of claim 4, wherein upon receiving the power-off command, the DMB modem determines if a level of an initial average voltage for DMB service is less than or equal to a threshold, and if the initial average voltage is less than or equal to the threshold, the DMB modem stores therein parameters used in an initial acquisition frequency table for DMB service and software for the DMB modem, and disables operation thereof.

7. The apparatus of claim 3, wherein the DMB modem comprises:
   a memory for interfacing with the power-off command provided from the controller; and
   a power-off controller for disabling the DMB modem in response to the power-off command.

8. A method for controlling battery power in a terminal including a digital multimedia broadcasting (DMB) modem for demodulating DMB signals and a controller for processing call signals, the method comprising the steps of:
   measuring, by the controller, an average voltage for a predetermined time;
   generating a power-off command and providing the power-off command to the DMB modem if the measured average voltage is less than or equal to a threshold;
   storing, by the DMB modem, at least one parameter upon receiving the power-off command; and
   disabling operation of the DMB modem after storing the at least one parameter.

9. The method of claim 8, further comprising the step of providing, by the DMB modem, information indicating a successful power-off to the controller.

10. The method of claim 8, wherein the at least one parameter comprises state parameters used in an initial acquisition frequency table for DMB service and software for the DMB modem.

* * * * *